3,669,676
FEED INTAKE LIMITING COMPOSITION FOR CATTLE
Melvin R. Karr, Lubbock, Tex., and Dean E. Hodge, St. Louis, Mo., assignors to Ralston Purina Company, St. Louis, Mo.
No Drawing. Filed July 13, 1970, Ser. No. 54,557
Int. Cl. A23k 1/00
U.S. Cl. 99—7                    6 Claims

ABSTRACT OF THE DISCLOSURE

A composition has been developed which has been found to effectively and efficiently limit protein or feed supplement intake to a prescribed amount in cattle when added to the supplement and which in turn allows self feeding of the supplement. The composition which has been found to effectively limit supplement intake contains materials which also individually contribute to the nutritional balance of the feed supplement comprising a mixture of fish oil, diammonium phosphate, ammonium sulfate and meat meal.

BACKGROUND OF THE INVENTION

This invention relates to a feed intake limiting composition for cattle and a process for employing the same to attain an economical and efficient means of self feeding cattle.

In the feeding of animals on pasture, particularly cattle, it is often very advantageous from the standpoint of economics, as well as convenience, for the cattle to be self fed, which means that the cattle are offered a feed or feed supplement on a free choice basis without periodic feedings of a rationed amount by a farmer of rancher each day. A disadvantage, however, of self feeding animals such as cattle is that the animals tend to over-eat feed supplements and consequently get a higher intake of feed or feed supplement than is completely necessary for proper weight gain or weight maintenance. This results in an additional expense to the rancher in having to provide additional and unnecessary amounts of protein or feed supplement to be fed in combination with a roughage source such as grass or hay.

It is therefore desirable to limit the intake of the protein or feed supplement to an amount which is the proper amount needed for proper weight gain or weight maintenance without consumption of more than is needed by the animal. As noted on page 699 of Morrison, Feeds and Feeding (1956), the prior art has incorporated salt or gypsum in the protein or feed supplement in order to control consumption of the protein supplement to a prescribed amount. A disadvantage, however, in employing either one of these compounds to control consumption of the protein supplement and accordingly provide an effective self feeding feed compoistion is that both materials provide little nutritional value and require mixing in large quantities with the supplement in order to reduce consumption thereof. For example, 1 part of salt to 3 parts of protein or feed supplement will ordinarily be required to reduce daily consumption in cattle to the desired amount. Another disadvantage of employing these materials is that salt poisoning of the animals may occur if water is not readily or freely available.

SUMMARY OF THE INVENTION

We have therefore developed a composition which has been found to be highly effective in limiting feed or protein supplement intake by cattle to a desired and predetermined amount which is also considered necessary for proper weight maintenance. We have also been able to develop a composition for the foregoing purpose which comprises a combination of materials which, while together are effective in limiting intake, also individually contribute to the nutritional balance of the ration. The composition does not require feeding in a large quantity and accordingly becomes both a convenient and economical means of limiting protein or feed supplement intake in cattle when incorporated in the protein or feed supplement. It furthermore does not require free access to water as does the gypsum or salt which has been used by the prior art to control intake thus overcoming a serious disadvantage of the prior art.

The composition we have developed is a mixture of fish oil, ammonium sulfate, diammonium phosphate and meat meal which is added in combination in a predetermined amount to a protein or feed supplement and which is then offered free choice to cattle in combination with a roughage source such as grass or hay. The combination of these materials contribute to and provide nutrient requirements for the feed supplement when incorporated therein, besides effectively limiting intake of the feed supplement to a prescribed amount. For example, meat meal is an effective and available source of protein, while the fish oil is an energy source for the cattle, and likewise a source of free fatty acids which have been found to be necessary for proper lactation of ruminants such as dairy cattle. The diammonium phosphate and ammonium sulfate likewise are used to meet the sulfur and phosphorous requirements of the cattle besides provide some contribution as nonprotein nitrogen sources which may be effectively converted to organismal protein by ruminants.

An object, therefore, of the present invention is to provide for a composition which consists of components which individually add to the nutrient requirements of a feed supplement, while in combination effectively limit feed supplement intake to a prescribed amount to allow self feeding to cattle.

It is also an object of the present inveniton to provide for a method of limiting supplement intake by cattle by administration of a composition which comprises various materials individually meeting nutrient requirements of the cattle which have been found in combination to effectively limit supplement intake and provide a method for self feeding of the protein or feed supplement in combination with a roughage source.

DESCRIPTION OF THE PREFERRED EMBODIMENTS

In accordance with the present invention the composition we have developed which has been found to be highly effective in limiting protein supplement intake by cattle to a predetermined amount comprises a unique combination of materials which individually and separately contribute to various nutritional factors in the feed supplement while at the same time render the supplement undesirable in taste or odor and accordingly limit supplement consumption or intake to the minimum predetermined amount which is necessary for proper weight maintenance. The predetermined amount of supplement consumption or intake for cattle will accordingly vary, depending on the type of animals and the environmental conditions under which they are maintained, although it may generally be considered that a preferred feed intake limitation for a protein supplement will vary between about 3 to 8 pounds of supplement per head of cattle per day. This amount of intake will generally be the minimum amount which is necessary for proper weight maintenance and most efficient feed utilization. Accordingly, it is preferable in a self feeding program to attain a feed intake limitation of between 3 to 8 pounds per head per day.

The composition which we have developed is a mixture of fish oil, ammonium sulfate, diammonium phosphate and meat meal which may be combined and added as a mixture to a protein or feed supplement or the components of the composition may be mixed individually therewith in the predetermined amounts. The protein or feed supplement with which the intake limiting composition of the present invention may be employed may be any feed or protein material generally intended to meet the full nutritional requirements of the animal with the exception of, as in the case of cattle, the various roughage sources which is considered necessary for proper feed utilization. Accordingly, the protein supplement may consist of various farinaceous or proteinaceous materials such as vegetable proteins among which are the oil seed materials such as soybeans, cotton seed or peanuts. These are considered to be highly utilizable and available sources of protein for animals. Likewise, various farinaceous materials which additionally contribute to the protein requirement of the feed supplement may also be added; among these are such grains as corn, milo, alfalfa or various wheat materials or wheat by-products.

If desired, the feed supplement may additionally contain various non-protein nitrogen materials such as urea or biuret which ruminant animals specifically are able to efficiently utilize and convert to organismal protein. This provides a cheap and effective source of nitrogen in a ruminant diet.

The protein or feed supplement will also typically contain various minerals considered essential for proper weight maintenance of animals such as cattle. Various vitamins, either fat or water soluble, will also be typically added to achieve complete nutritional balance. Among these are the fat soluble vitamins such as A, D, E, as well as members of the B vitamin group, among which are $B_1$, $B_2$, $B_6$, and $B_{12}$.

The protein of feed supplement which may be used in the present invention may also typically contain various medicaments or additives either for the purpose of disease control or for improving weight maintenance of the animals, such additives or medicaments will be such materials as antibiotics, bacteriostats or hormones.

For the most effective results, a protein supplement will be fed in combination with various cellulosic roughage sources such as grass, hays or silage. The present invention is not intended to be limited insofar as any specific roughage sources to be used in combination with the protein or feed supplement containing the intake limiting composition, since the particular roughage sources are generally dictated by local availability of various forage crops.

The fish oil which is used as a part of the feed intake limiting composition of the present invention may be generally any type of available fish oil, although we have found Menhaden fish oil to be highly effective in the present composition and is preferred primarily because of its ready availability. The feed intake limiting composition we have developed will contain a sufficient quantity of fish oil so that the final protein or feed supplement will contain between about 1–12% by weight of the fish oil, although preferably the fish oil concentration in the protein supplement will more typically vary from 3–9%. The amount of fish oil which will be utilized will vary depending on the feed intake desired and the percentage may be varied within the preferred range stated to achieve a preferred feed intake limitation of between about 3–8 pounds of supplement per head of cattle per day when used in combination with the preferred amounts of other ingredients of the feed intake limiting composition.

The feed intake limiting composition will also contain sufficient ammonium sulfate so that the feed or protein supplement to which the composition is added will contain between about 0.1–5% by weight of ammonium sulfate, although preferably the amount of ammonium sulfate may be varied between 1 and 4% to also achieve the preferred intake limitation of 3–8 pounds of supplement per head per day when used in combination with the preferred amounts of the other ingredients of the intake limiting composition. The type of ammonium sulfate which may be employed in the present invention may be generally of any type considered suitable for feed use and being of sufficient purity to not have any deleterious effect on the animal.

The feed intake limiting composition of the present invention will also contain sufficient diammonium phosphate so that the feed or protein supplement to which the composition is added will contain between about 0.1–5% by weight of diammonium phosphate; also preferably the amount of diammonium phosphate may be varied between 2 and 5% to also achieve the preferred intake limitation of 3–8 pounds of supplement per head per day when used in combination with the preferred amounts of the other ingredients of the intake limiting composition. Likewise, the present invention is not limited on the type or purity of diammonium phosphate which may be employed and any source of this material considered suitable for feed use may be employed in the present invention.

The intake limiting composition will also contain as an ingredient, meat meal or an equivalent, dried or ground meat scraps of meat by-products in such an amount so that the feed or protein supplement to which the composition is added will contain between about 0.1–20% by weight of meat meal; also preferably the amount of meat meal may be varied between 3–17% by weight to also achieve the preferred intake limitation of 3–8 pounds per head per day when used in combination with the preferred amounts of other ingredients of the intake limiting composition.

The intake limiting composition which combines a mixture of meat meal, diammonium phosphate, ammonium sulfate and fish oil may be added to a protein or feed supplement to limit the intake of the same, and accordingly said protein supplement will be typically administered or fed to cattle in combination with a roughage or forage source. The protein or feed supplement containing the intake limiting composition may be fed in any manner or form considered to be suitable for feeding animals such as cattle. For example, the protein or feed supplement containing the intake limiting composition may be formed into pellets or cubes and fed in this form or it may be compressed into large blocks and offered free choice to cattle grazing on a pasture or range. It is preferred, however, to feed or administer the protein or feed supplement containing the intake limiting composition in meal or mash form in such a manner that the cattle have free and ready access to it. While the present invention is not to be limited to any particular theory of operation, feeding the supplement with the composition in meal or mash form apparently attains somewhat more effective results than when the composition is used in the form of cubes or pellets as well as range blocks. It may be theorized, therefore, that the undesirable taste of the intake composition of the present invention is more readily apparent to the cattle when fed in a meal form.

As previously noted, the intake limiting composition we have developed is desirable because it requires feeding at low amounts to limit intake as well as being composed of materials which individually contribute to the nutritional balance of the protein supplement, while on the other hand the combination of materials effectively control daily consumption of the protein or feed supplement to a predetermined amount which is considered the minimum amount necessary for weight maintenace of the animal. This in turn allows the supplement to be efficiently self fed to cattle with consumption of only the minimum amount as is necessary without over-eating or otherwise wasting the supplement.

The present invention will be more fully apparent and will accordingly be described in the following examples:

EXAMPLE 1

Eighteen Holstein steers averaging 610 pounds in weight and consuming approximately 18 pounds of test feed supplement were used to determine intake reduction of the present composition. For a period of 21 days, these animals were fed a feed supplement consisting of the following ingredients:

| Ingredients: | Pounds |
|---|---|
| Gr. Milo | 792.00 |
| Dehy. alfalfa (17) | 66.00 |
| Calcium carbonate | 16.50 |
| Dairy salt | 22.00 |
| Vit. A Premix (10,000) | 2.64 |

To this feed supplement was tdded the following materials:

| Ingredients | Pounds | Percent by weight |
|---|---|---|
| Meat meal | 63.36 | 4.3 |
| Diammonium phosphate | 44.00 | 4.5 |
| Ammonium sulfate | 27.50 | 3.0 |
| Menhaden fish oil | 66.00 | 8.0 |

The feed supplement with the intake limiting composition in meal form was offered free choice to the cattle for this period in combination with a roughage source and it was found that during the period of this test, a feed consumption or intake was effectively reduced in all steers to an average of about 5.5 pounds per head per day as compared to a general average of about 18 pounds per head per day prior to being fed the present feed supplement. All of the cattle on the present test maintained their weight for the period involved.

It may be seen that the feed intake limiting composition effectively reduced consumption to the desired amount, enabling the cattle to be self fed for the period in question while still adequately maintaining their weight.

EXAMPLE 2

The 18 Holstein steers as listed in Example 1 were offered the feed supplement in metal form as in Example 1 without the intake composition intermixed therewith, but with 4% fish oil being added to the feed supplement. This was found to not be effective in reducing intake consumption to the desired amount, the consumption only being reduced to about 10 pounds per head per day.

EXAMPLE 3

Sixty-four heifers, each weighing about 450 pounds were furnished the feed supplement in meal form as listed in Example 1, to which was added a 3% by weight of fish oil, 2.5% by weight of diammonium phosphate, .5% by weight of ammonium sulfate and 8.1% of meat meal. This was found to effectively reduce intake consumption to about 5 pounds per head per day for a period of approximately 30–40 days. At the end of this period, average final weight of heifers receiving this amount of the intake limiting composition had an average final weight of about 497 pounds.

It is our intention to set forth in the appended claims all such equivalents or modifications as may reasonably be included within their scope.

We claim:

1. A feed supplement containing a feed supplement intake limiting composition designed to limit said supplement intake to 3 to 8 lbs. per head of cattle per day, said feed supplement being principally grain, said intake limiting composition comprising fish oil about 1 to about 12%; meat meal about 0.1 to about 20%; ammonium sulfate about 1 to about 5%; diammonium phosphate 0.1–5% by weight of said feed supplement.

2. The product of claim 1 in which the fish oil is present in an amount between about 3 to about 9%.

3. The product of claim 1 in which the meat meal is present in an amount of about 3 to about 17%.

4. The product of claim 1 in which ammonium sulfate is present in an amount between 1 and 4%.

5. The product of claim 1 in which diammonium phosphate is present in an amount between 2 and 5%.

6. A feed supplement containing a feed supplement intake limiting composition designed to limit the feed supplement intake to 3 to 8 lbs. per head of cattle per day said feed supplement being essentially grain; said intake limiting composition comprising fish oil in an amount of about 3 to about 9%; meat meal in an amount of about 3 to about 17%; ammonium sulfate in an amount of about 1 to about 4% and diammonium phosphate in an amount of about 2 to about 5% by weight of said feed supplement.

References Cited

UNITED STATES PATENTS

| | | | |
|---|---|---|---|
| 3,420,672 | 1/1969 | Appleman | 99—2 |
| 3,020,157 | 2/1962 | Fetzer | 99—2 |
| 2,840,473 | 6/1958 | Lux | 99—2 |

NORMAN YUDKOFF, Primary Examiner

H. H. BERNSTEIN, Assistant Examiner

U.S. Cl. X.R.

99—2

UNITED STATES PATENT OFFICE
CERTIFICATE OF CORRECTION

Patent No. 3,669,676            Dated June 13, 1972

Inventor(s) Melvin R. Karr & Dean E. Hodge

It is certified that error appears in the above-identified patent and that said Letters Patent are hereby corrected as shown below:

Column 6, line 20 - "1" should read -- 0.1 --

Signed and sealed this 25th day of December 1973.

(SEAL)
Attest:

EDWARD M. FLETCHER, JR.        RENE D. TEGTMEYER
Attesting Officer                Acting Commissioner of Patents